United States Patent
Guo et al.

(10) Patent No.: US 11,545,170 B2
(45) Date of Patent: *Jan. 3, 2023

(54) ACOUSTIC NEURAL NETWORK SCENE DETECTION

(71) Applicant: Snap Inc., Santa Monica, CA (US)

(72) Inventors: Jinxi Guo, Los Angeles, CA (US); Jia Li, Marina Del Rey, CA (US); Ning Xu, Irvine, CA (US)

(73) Assignee: Snap Inc., Santa Monica, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 17/247,137

(22) Filed: Dec. 1, 2020

(65) Prior Publication Data

US 2021/0082453 A1     Mar. 18, 2021

Related U.S. Application Data

(63) Continuation of application No. 15/908,412, filed on Feb. 28, 2018, now Pat. No. 10,878,837.
(Continued)

(51) Int. Cl.
*G10L 25/30*     (2013.01)
*H04S 7/00*      (2006.01)
(Continued)

(52) U.S. Cl.
CPC ............ *G10L 25/30* (2013.01); *G06K 9/6267* (2013.01); *G06N 3/0454* (2013.01); *G06V 20/00* (2022.01); *H04S 7/40* (2013.01)

(58) Field of Classification Search
CPC ...... G06N 3/0445; G06N 3/0454; G06N 3/04; G06N 3/02; G06N 3/08; G06N 3/084;
(Continued)

(56) References Cited

U.S. PATENT DOCUMENTS 5,754,939 A    5/1998  Herz et al.
6,038,295 A    3/2000  Mattes
(Continued)

FOREIGN PATENT DOCUMENTS

CA           2887596 A1    7/2015
WO    WO-2012000107 A1    1/2012
(Continued)

OTHER PUBLICATIONS

"Attention-Based Bidirectional Long Short-Term Memory Networks for Relation Classification" by Peng Zhou, etc., Proceedings of the 54th Annual Meeting of the Association for Computational Linguistics, Berlin, Germany, Aug. 7-12,, pp. 207-212 (Year: 2016).*

(Continued)

*Primary Examiner* — Leshui Zhang
(74) *Attorney, Agent, or Firm* — Schwegman Lundberg & Woessner, P.A.

(57) ABSTRACT

An acoustic environment identification system is disclosed that can use neural networks to accurately identify environments. The acoustic environment identification system can use one or more convolutional neural networks to generate audio feature data. A recursive neural network can process the audio feature data to generate characterization data. The characterization data can be modified using a weighting system that weights signature data items. Classification neural networks can be used to generate a classification of an environment.

20 Claims, 11 Drawing Sheets

Related U.S. Application Data

(60) Provisional application No. 62/465,550, filed on Mar. 1, 2017.

(51) Int. Cl.
  *G06K 9/62* (2022.01)
  *G06N 3/04* (2006.01)
  *G06V 20/00* (2022.01)

(58) Field of Classification Search
  CPC ......... G06N 3/00; G10L 15/063; G10L 15/16; G10L 25/30; G10L 21/02; G06K 9/6256; G06K 9/6267; G06K 9/6272; G06K 9/62; G06Q 30/0269; G06F 40/30; G06V 20/00; G06V 10/82; H04S 7/40; H04S 7/00
  USPC ....... 704/201, 202, E15.014; 706/15, 16, 17, 706/18, 19, 20, 26, 27, 30, 31, 39
  See application file for complete search history.

(56) References Cited

U.S. PATENT DOCUMENTS

| | | |
|---|---|---|
| 6,158,044 A | 12/2000 | Tibbetts |
| 6,167,435 A | 12/2000 | Druckenmiller et al. |
| 6,205,432 B1 | 3/2001 | Gabbard et al. |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 10,878,837 B1 | 12/2020 | Guo et al. |
| 2002/0047868 A1 | 4/2002 | Miyazawa |
| 2002/0144154 A1 | 10/2002 | Tomkow |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073538 A1 | 3/2007 | Rifkin |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0042588 A1 | 2/2009 | Lottin et al. |
| 2009/0132453 A1 | 5/2009 | Hangartner et al. |
| 2010/0027820 A1* | 2/2010 | Kates .................. H04R 25/505 381/312 |
| 2010/0082427 A1 | 4/2010 | Burgener et al. |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0194301 A1 | 8/2013 | Robbins et al. |

(56) References Cited

U.S. PATENT DOCUMENTS

| | | |
|---|---|---|
| 2013/0290443 A1 | 10/2013 | Collins et al. |
| 2014/0032682 A1 | 1/2014 | Prado et al. |
| 2014/0122787 A1 | 5/2014 | Shalvi et al. |
| 2014/0201527 A1 | 7/2014 | Krivorot |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0199082 A1 | 7/2015 | Scholler et al. |
| 2015/0227602 A1 | 8/2015 | Ramu et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0180887 A1 | 6/2016 | Sehn |
| 2016/0196257 A1 | 7/2016 | Choi |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0148431 A1* | 5/2017 | Catanzaro ............ G10L 25/21 |
| 2017/0161382 A1 | 6/2017 | Ouimet et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0330586 A1 | 11/2017 | Roblek et al. |
| 2017/0374003 A1 | 12/2017 | Allen et al. |
| 2017/0374508 A1 | 12/2017 | Davis et al. |
| 2018/0075343 A1 | 3/2018 | Van Den Oord et al. |
| 2018/0121788 A1* | 5/2018 | Hashimoto ............ G06N 3/08 |

FOREIGN PATENT DOCUMENTS

| | | |
|---|---|---|
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |

OTHER PUBLICATIONS

"U.S. Appl. No. 15/908,412, Examiner interview Summary dated May 13, 2019", 4 pgs.

"U.S. Appl. No. 15/908,412, Final Office Action dated Aug. 21, 2019", 18 pgs.

"U.S. Appl. No. 15/908,412, Non Final Office Action dated Feb. 7, 2019", 14 pgs.

"U.S. Appl. No. 15/908,412, Non Final Office Action dated Feb. 20, 2020", 20 pgs.

"U.S. Appl. No. 15/908,412, Non Final Office Action dated Mar. 4, 2020", 19 pgs.

"U.S. Appl. No. 15/908,412, Notice of Allowance dated Aug. 26, 2020", 10 pgs.

"U.S. Appl. No. 15/908,412, Response filed Aug. 4, 2020 to Non Final Office Action dated Mar. 4, 2020", 22 pgs.

"U.S. Appl. No. 15/908,412, Response filed Nov. 21, 2019 to Final Office Action dated Aug. 21, 2019", 15 pgs.

"U.S. Appl. No. 15/908,412, Response filed May 7, 2019 to Non Final Office Action dated Feb. 7, 2019", 15 pgs.

U.S. Appl. No. 15/908,412, filed Feb. 28, 2018, Acoustic Neural Network Scene Detection.

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL: http://www.eweek.com/print/c/a/MessagingandCollaboration/StealthTextShouldYouChooseto AcceptIt>, (Dec. 13, 2005), 2 pgs.

\* cited by examiner

ACOUSTIC NEURAL NETWORK SCENE DETECTION

CLAIM OF PRIORITY

This application is a continuation of U.S. patent application Ser. No. 15/908,412, filed on Feb. 28, 2018, which claims the benefit of priority to U.S. Provisional Application Ser. No. 62/465,550, filed on Mar. 1, 2017, the disclosures of each of which are incorporated herein by reference in their entireties.

TECHNICAL FIELD

Embodiments of the present disclosure relate generally to environment recognition and, more particularly, but not by way of limitation, to acoustic based environment classification using neural networks.

BACKGROUND

Audio sounds carry a large amount of information about our everyday environment and physical events that take place in it. Having a machine that understands the environment, e.g., through acoustic events inside the recording, is important for many applications such as security surveillance, context-aware services, and video scene identification combined with image scene detection. However, identifying the location in which a specific audio file was recorded, e.g., a beach or on a bus, is a challenging task for a machine. The complex sound composition of real life audio recordings makes it difficult to obtain representative features for recognition.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
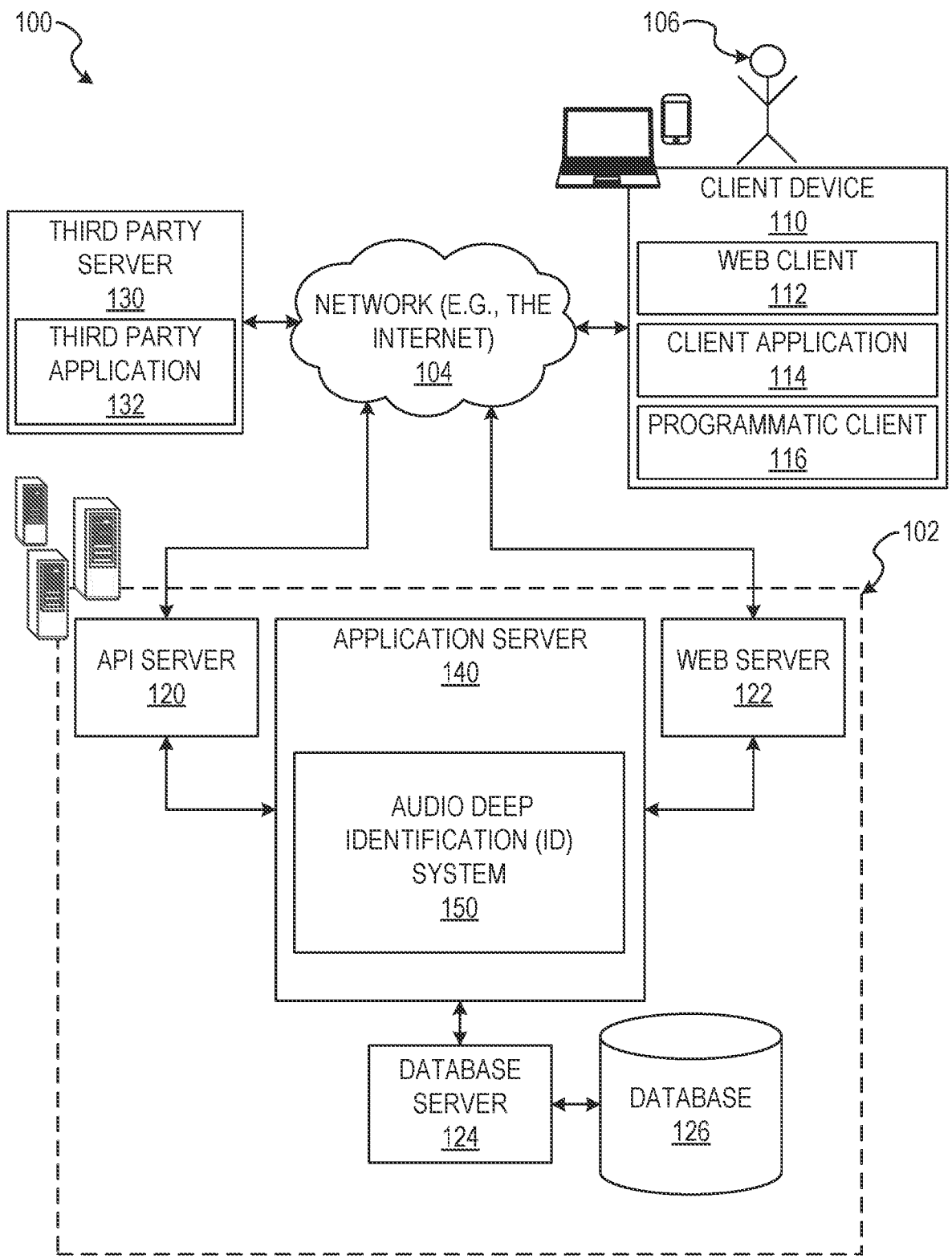
FIG. 1 shows a block diagram illustrating a networked system for environment recognition, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Audio sounds carry information about our everyday environment and physical events that take place in it. Having a machine that understands the environment, e.g., through acoustic events inside the recording, is important for many applications such as security surveillance, context-aware services and video scene identification by combining with image scene detection. However, identifying the location in which a specific audio file was recorded, e.g., at a beach or on a bus, is a challenging task for a machine. The complex sound composition of real life audio recordings makes it difficult to obtain representative features for recognition. Compounding the problem, with the rise of social media networks, many available audio samples are extremely short in duration (e.g., ~6 seconds of audio from a short video clip) and using a machine to detect a scene type may be extremely difficult because short samples have fewer audio clues of scene type.

To address these issues, an audio deep identification (ID) system implements a novel framework of neural networks to more accurately classify an environment using acoustic data from the environment. In some example embodiments, three types of neural network layers are implemented, including a convolution layer, a recursive layer, e.g., a bidirectional long short-term memory (LSTM) layer, and a fully connected layer. The convolution layer extracts the hierarchical feature representation from acoustic data recorded from an environment. The recursive layer models the sequential information, including the feature representation data generated from the convolution layer. The fully connected layer classifies the environment using the sequential information generated from the recursive layer. In this way, the acoustic data from a given environment can be efficiently and accurately identified.

Furthermore, according to some example embodiments, an attention mechanism can be implemented to weight the hidden states of each time step in the recursive layer to predict the importance of the corresponding hidden states, as discussed in further detail below. In some example embodiments, the weighted sum of the hidden states are used as input for the next layers (e.g., the classification layers). The recursive vector (e.g., LSTM hidden state vector) and the attention vector (e.g., the vector generated by the attention mechanism) exhibit different and complementary data. In some example embodiments, the two vectors are combined and used to continually train the attention mechanism and the recursive layer. The combination of the two vectors in training synergistically characterizes the acoustic data to produce significantly more accurate acoustic classifications.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or a wide area network (WAN)) to one or more client devices 110. In some implementations, a user (e.g., user 106) interacts with the networked system 102 using the client device 110. FIG. 1 illustrates, for example, a web client 112 (e.g., a browser), applications 114, and a programmatic client 116 executing on the client device 110. The client device 110 includes the web client 112, the client application 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, personal digital assistant (PDA), smart phone, tablet, ultrabook, netbook, laptop, desktop, multi-processor system, microprocessor-based or programmable consumer electronic, game consoles, set-top box, network personal computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a wireless fidelity (WI-FI®) network, a Worldwide Interoperability for Microwave Access (WiMax) network, another type of network, or any suitable combination thereof.

In some example embodiments, the client device 110 includes one or more of the applications 114 (also referred to as "apps") such as, but not limited to, web browsers, book reader apps (operable to read e-books), media apps (operable to present various media forms including audio and video), fitness apps, biometric monitoring apps, messaging apps, and electronic mail (email) apps. In some implementations, the client application 114 include various components operable to present information to the user 106 and communicate with networked system 102.

The web client 112 accesses the various systems of the networked system 102 via the web interface supported by a web server 122. Similarly, the programmatic client 116 and client application 114 access the various services and functions provided by the networked system 102 via the programmatic interface provided by an application program interface (API) server 120.

Users (e.g., the user 106) comprise a person, a machine, or other means of interacting with the client device 110. In some example embodiments, the user 106 is not part of the network architecture 100, but interacts with the network architecture 100 via the client device 110 or another means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

The API server 120 and the web server 122 are coupled to, and provide programmatic and web interfaces respectively to, one or more application servers 140. The application server 140 can host an audio deep ID system 150, which can comprise one or more modules or applications 114, each of which can be embodied as hardware, software, firmware, or any combination thereof. The application server 140 is, in turn, shown to be coupled to a database server 124 that facilitates access to one or more information storage repositories, such as database 126. In an example embodiment, the database 126 comprises one or more storage devices that store information to be accessed by audio deep ID system 150 or client device 110. Additionally, a third party application 132, executing on third party server 130, is shown as having programmatic access to the networked system 102 via the programmatic interface provided by the API server 120. For example, the third party application 132, utilizing information retrieved from the networked system 102, supports one or more features or functions on a website hosted by the third party. While audio deep ID system 150 is illustrated as executing from application server 140 in FIG. 1, in some example embodiments, audio deep ID system 150 is installed as part of application 114 and run from client device 110, as is appreciated by those of ordinary skill in the art.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the application server 140 (e.g., the audio deep ID system 150) can also be implemented as standalone software programs, which do not necessarily have networking capabilities.

Figure 2:
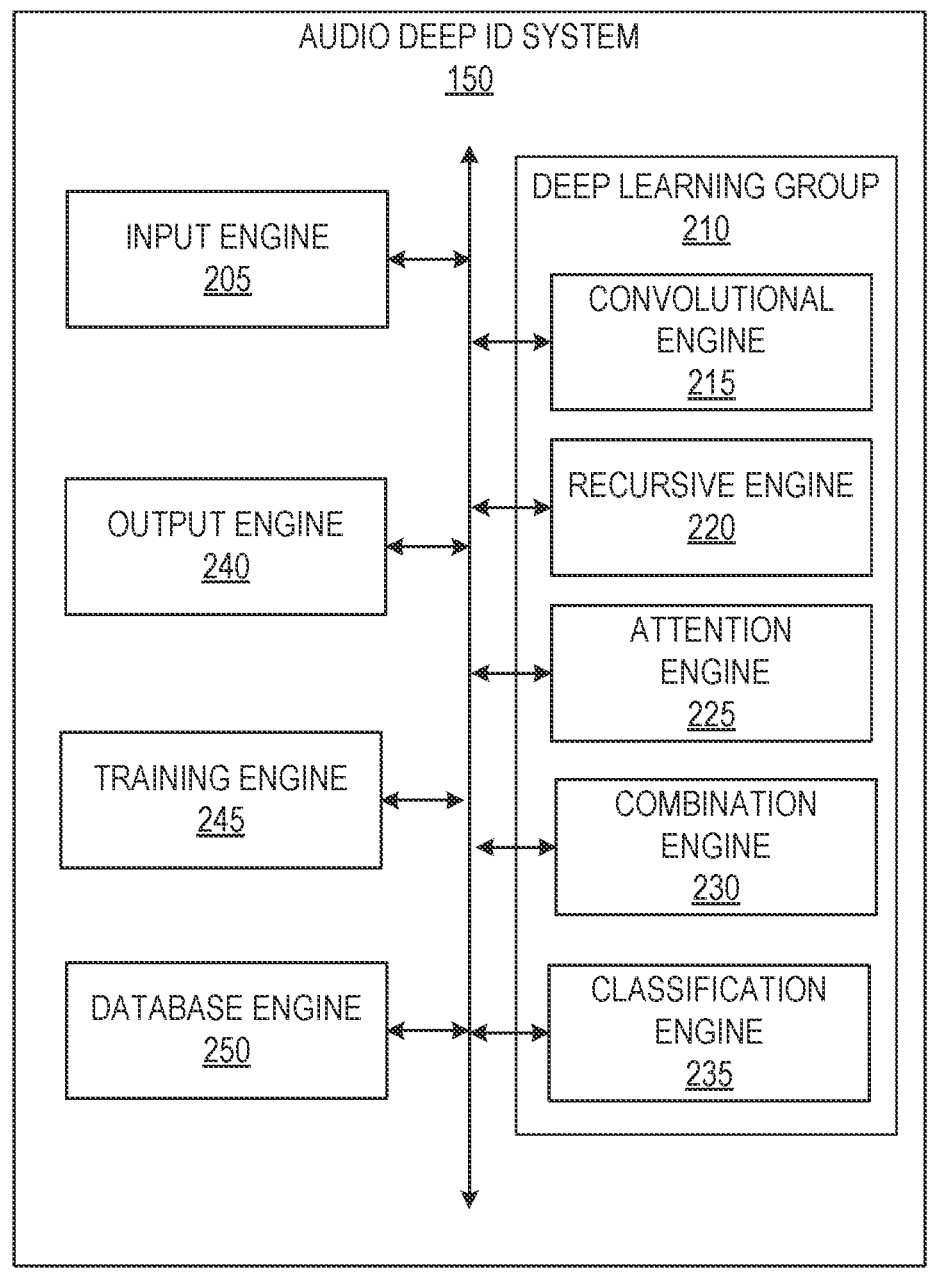
FIG. 2 shows a block diagram showing example components provided within the environment recognition system of FIG. 1, according to some example embodiments.

FIG. 2 illustrates a block diagram showing functional components provided within the audio deep ID system 150, according to some embodiments. In various example embodiments, the audio deep ID system 150 comprises an input engine 205, a deep learning group 210, an output engine 240, a training engine 245, and a database engine 250. Further, according to some example embodiments, the deep learning group 210 comprises one or more engines including a convolutional engine 215, a recursive engine 220, an attention engine 225, a combination engine 230, and a classification engine 235. The components themselves are communicatively coupled (e.g., via appropriate interfaces) to each other and to various data sources, so as to allow information to be passed between the components or so as to allow the components to share and access common data. Furthermore, the components access the database 126 via the database server 124 and the database engine 250.

The input engine 205 manages generating the audio data for a given environment, according to some example embodiments. The input engine 205 may implement a transducer, e.g., a microphone, to record the environment to create audio data. The audio data can be in different formats including visual formats (e.g., a spectrogram).

The deep learning group 210 is a collection of one or more engines that perform classification of the environment based on the audio data from the environment. In some example embodiments, the deep learning group 210 implements a collection of artificial neural networks to perform the classification on the environment, as discussed in further detail below.

The training engine 245 is configured to train the deep learning group 210 using audio training data recorded from different environments. In some example embodiments, the audio training data is prerecorded audio data of different environments, such as a restaurant, a park, or an office. The training engine 245 uses the audio training data to maximize or improve the likelihood of a correct classification using neural network training techniques, such as back propagation.

The database engine 250 is configured to interface with the database server 124 to store and retrieve the audio training data in the database 126. For example, the database server 124 may be an SAP® database server or an Oracle® database server, and the database engine 250 is configured to interface with the different types of database servers 124 using different kinds of database code (e.g., Oracle SQL for Oracle® server, ABAP for SAP® servers) per implementation.

The output engine 240 is configured to receive a classification from the deep learning group 210 and use it for different tasks such as security surveillance, context-aware services, and video scene identification. For example, a user 106 may record a video stream using his/her camera and microphone of his/her client device 110. The audio data from the video stream can be used by the deep learning group 210 to determine that the user 106 is in a restaurant. Based on the environment being classified as restaurant, the output engine 240 may provide the user 106 an option to overlay cartoon forks and knives over his/her video stream. The modified video stream may then be posted to social network for viewing by other users on their own respective client devices 110.

Figure 3:
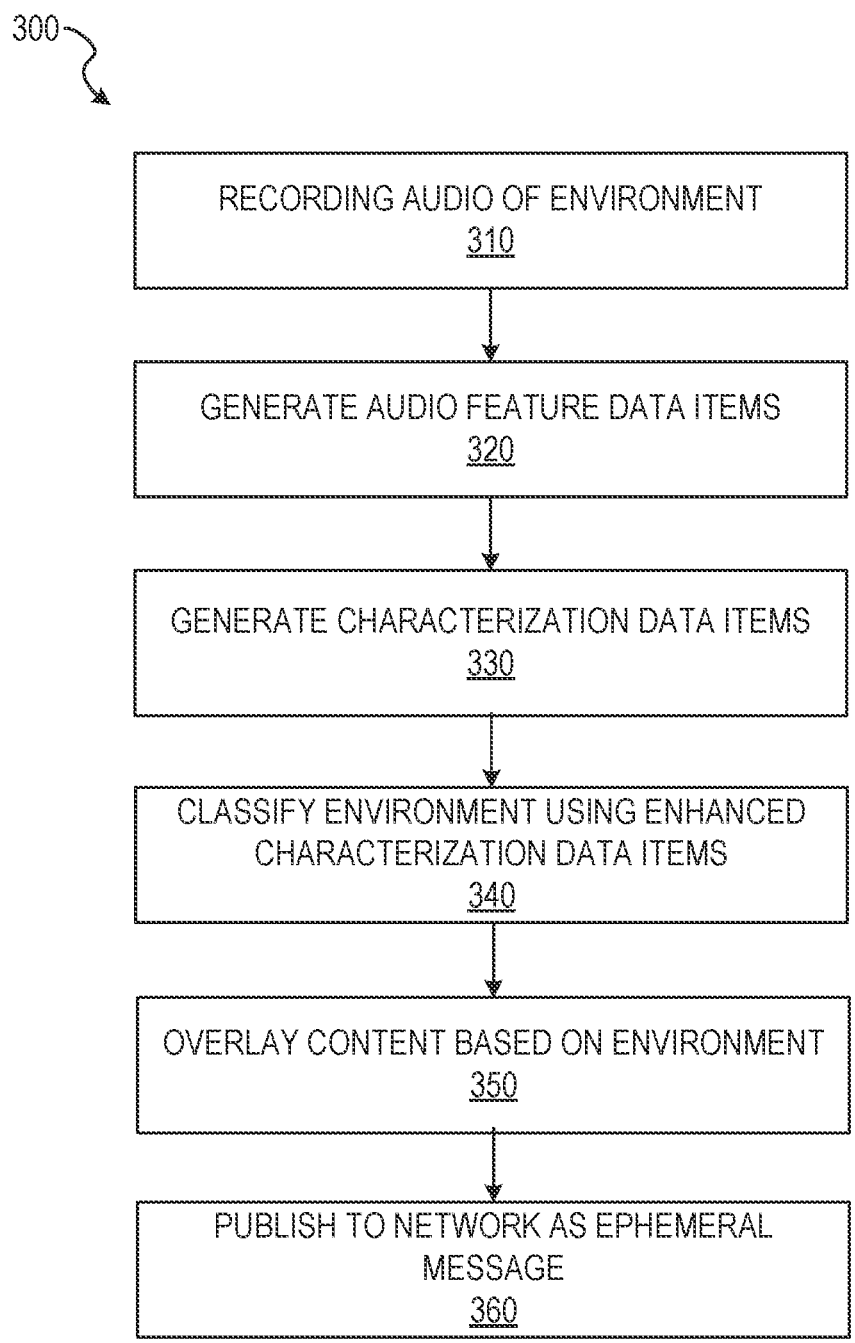
FIG. 3 shows a flow diagram of a method for performing acoustic based recognition of environments, according to some example embodiments.

FIG. 3 shows a flow diagram of a method 300 detecting a scene using a neural network, according to some example embodiments. At operation 310, the input engine 205 generates audio data from the environment. For example, the input engine 205 uses a transducer, e.g., a microphone, to record acoustic data from the environment. The acoustic data may be initially in an audio format such as Waveform Audio File Format (WAV). The acoustic data may be accompanied by one or more frames of a live video being displayed or recorded on client device 110. The input engine 205 then converts the acoustic data into audio data in a visual format, e.g., a spectrogram, for further analysis by the deep learning group 210, according to some example embodiments.

Operations 320-340 are performed by the functional engines of the deep learning group 210. At operation 320, the convolutional engine 215 processes the audio data to generate audio feature data items that describe audio features (e.g., sounds such as a knife being dropped, or a school bus horn) of the environment. In some example embodiments, the convolutional engine 215 implements a convolutional neural network that uses the audio data to generate the audio feature data as vector data that can be processed in one or more hidden layers the neural network architecture.

At operation 330, the recursive engine 220 processes the audio feature data to generate characterization data items. In some example embodiments, the recursive engine 220 implements a recursive neural network (e.g., an LSTM) that ingests the audio feature data to output the characterization data as vector data. At operation 340, the classification engine 235 processes the characterization data to generate classification data for the environment.

The classification data may include a numerical quantity from 0 to 1 that indicates the likelihood that the environment is of a given scene type, e.g., a restaurant, a street, or a classroom. For example, the classification data may generate a score of 0.45 for the restaurant scene probability, a score of 0.66 for the street scene probability, and a classroom scene probability of 0.89. In some example embodiments, the classification engine 235 classifies the environment as the scene type having the highest scene probability. Thus, in the example above, the recorded environment is classified as a classroom scene because the classroom scene has the highest scene probability.

At operation 350, based on the classification, the output engine 240 selects one or more items of content for overlay on one or more images of the live video feed. For example, if the environment is classified as a classroom, the overlay content may include a cartoon chalkboard and a cartoon apple, or a location tag (e.g., "Santa Monica High School") as overlay content on the live video feed, which shows images or video of a classroom. At operation 360, the output engine 240 publishes the one or more frames of the live video feed with the overlay content as an ephemeral message of a social media network site (e.g., a website, a mobile app). An ephemeral message is a message that other users 106 of the social media network site can temporarily access for a pre-specified amount of time (e.g., 1 hour, 24 hours). Upon expiry of the pre-specified amount of time, the ephemeral message expires and is made inaccessible to users 106 of the social media network site.

Figure 4:
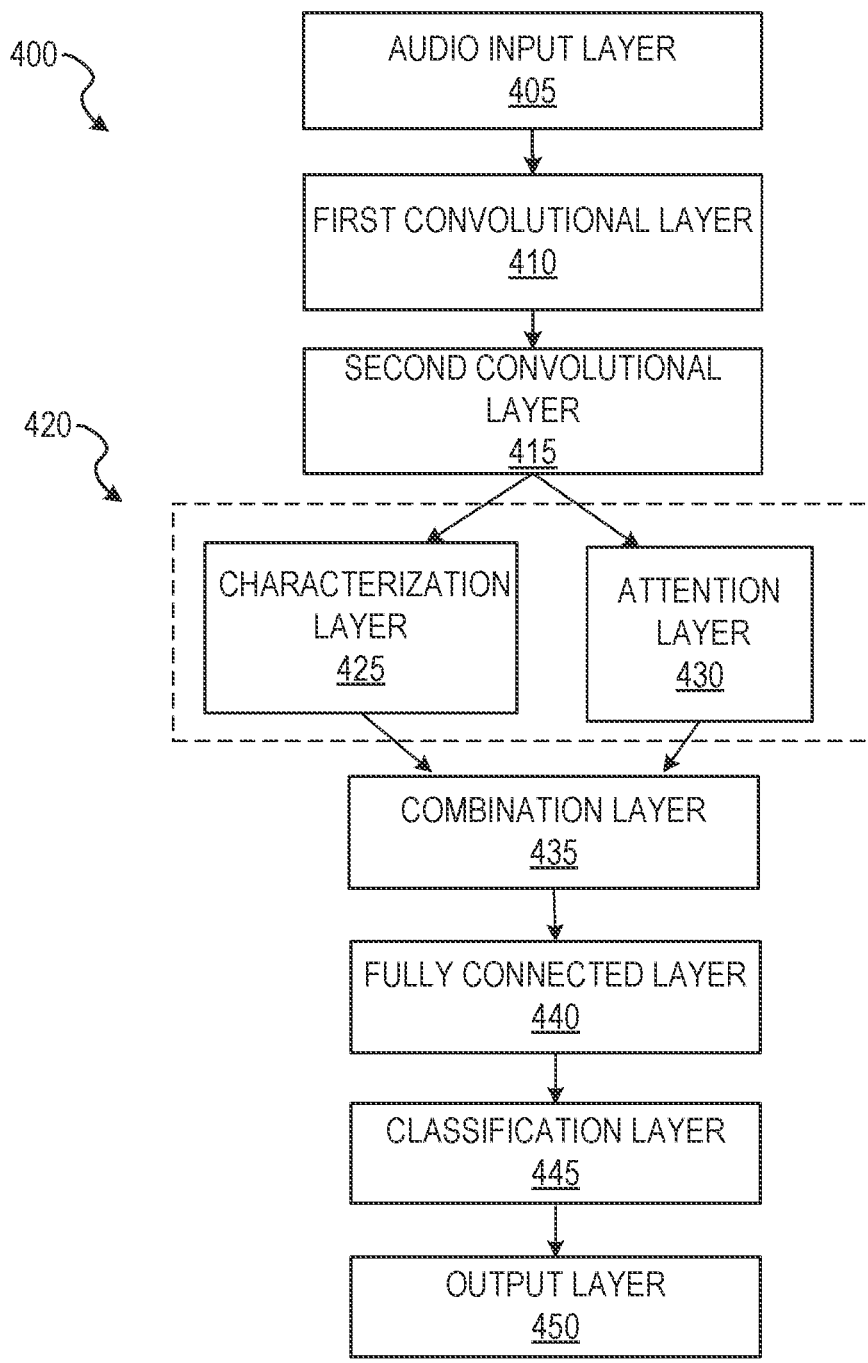
FIG. 4 shows an architecture diagram for implementing acoustic based environment classification using neural networks, according to some example embodiments.

FIG. 4 illustrates an architecture diagram of a flow 400 for implementing acoustic based environment classification using neural networks, according to some example embodiments. Each of the solid line blocks is a functional layer that implements a mechanism, such as a neural network. The arrows between the functional layers of FIG. 4 represent the output of data from one functional layer into the next functional layer (e.g., the audio input layer 405 generates a data output that is input into the first convolutional layer 410). The flow 400 is an example embodiment of the method 300 in FIG. 3 in that audio data is the initial input and the output is a scene classification.

According to some example embodiments, the initial layer is the audio input layer 405. The audio input layer 405 implements a transducer to record an environment and generate audio data for analysis. For example, the audio input layer 405 may use a microphone of the client device 110 to record the surrounding environment. The audio data is then conveyed to the first convolutional layer 410, and then to the second convolutional layer 415. The convolutional layers are convolutional neural networks configured to extract features from the audio data at different scales. For example, the first convolutional layer 410 may be configured to generate feature data of large audio features at a first scale (e.g., loud or longer noises), while the second convolutional layer 415 is configured to generate feature data of small audio features at a second, smaller scale (e.g., short, subtle noises). In the example illustrated in FIG. 4, the first convolutional layer 410 receives the audio data as an input from audio input layer 405. The first convolutional layer 410 then processes the audio data to generate vector data having audio features described at a larger scale. The vector data having audio features described at a larger scale is then input into the second convolutional layer 415. The second convolutional layer 415 receives the data and generates audio feature data that describes features at a smaller scale.

The output data from the second convolutional layer 415 is then input into a characterization multi-layer 420, according to some example embodiments. As illustrated, the characterization multi-layer 420 comprises a characterization layer 425 and an attention layer 430. The characterization layer 425 uses a neural network to implement time sequential modeling of the audio feature data. That is, the characterization layer 425 uses a neural network that summarizes the audio feature data temporally. In some example embodiments, the characterization layer 425 is a bi-directional LSTM neural network that takes into account the forward time direction (e.g., from the start of the recorded audio data to the end of the recorded audio data) in the audio data and reverse time direction (e.g., from the end of the recorded audio data to the start of the recorded audio data). The bi-directional LSTM processes the data recursively over a plurality of hidden time steps, as is understood by those having ordinary skill in the art of artificial neural networks. In some embodiments, the last output from the second convolutional layer 415 is reshaped into a sequence of vectors before being input into the characterization layer 425. Each vector of the sequence represents a sound feature extracted for a given time step in an LSTM in the characterization layer 425. Further, the bi-directional LSTM concatenates the final state of the forward direction and the final state of the reverse direction to generate the output of characterization layer 425. Other types of LSTMs can also be implemented in the characterization layer 425, such as a forward LSTM or backward LSTM, as discussed below.

The attention layer 430 is a fully connected neural network layer that is parallel to the characterization layer 425, according to some example embodiments. During training, each scene may have signature sounds that are strongly associated with a given type of environment. For example, dishes dropping and forks and knives clacking together may be signature sounds of a restaurant. In contrast, some sounds or lack thereof (e.g., silence) do not help identify which environment is which. The attention layer 430 is trained (e.g., via back propagation) to more heavily weight hidden state time steps that contain signature sounds. In some example embodiments, the attention layer 430 is further configured to attenuate the value of the hidden state time steps that do not contain signature sounds. For example, if a hidden state time step contains audio data of dishes clacking together, the attention layer 430 will more heavily weight the vector of the hidden state time step. In contrast, if a hidden state time step is a time step containing only silence or subtle sounds, the attention layer 430 will decrease the value of the vector of the hidden state time step.

According to some example embodiments, the attention layer 430 weights each hidden state of the bi-directional LSTM to generate a weighted sum. In particular, the attention layer 430 uses each hidden state time stamp vector of the bi-directional LSTM to weight itself (e.g., amplify or diminish its own value), thereby predicting its own value. For a given time step, once the weighting is generated, it may be combined with the vector of the LSTM time step through multiplication, as discussed in further detail below.

The attention layer 430 may use different schemes to produce weightings. In one example embodiment, each hidden state predicts its own weight using a fully connected layer. That is, the vector of a hidden state of the LSTM in the characterization layer 425 is input into the fully connected layer in the attention layer 430, which generates a predicted weighting. The predicted weighting is then combined with the vector of the hidden state through multiplication.

In another example embodiment, all hidden states of the LSTM work together, in concert, to predict all weights for each of the time steps using an individual fully connected layer. This approach takes into account information of the entire sequence (from beginning of audio data to the end) to predict weights for each time step.

In yet another example embodiment, all hidden states of the LSTM work together, using a convolution layer that feeds into a max pooling layer. This approach retrieves time local information (e.g., vector data for a time step) and extracts the features to predict all weights.

The combination layer 435 is configured to combine the data received from the characterization layer 425 and the attention layer 430, according to some example embodiments. FIGS. 5-8 illustrate various example architectures for the characterization layer 425 and combination layer 435, according to some example embodiments. In some example embodiments, the output from the combination layer 435 is input into a fully connected layer 440. Generally, the fully connected layer 440 and the classification layer 445 manage classification of the audio data to generate scene classification scores. The fully connected layer 440 implements a fully connected neural network to modify the data received form the combination layer 435 according to how the fully connected neural network is weighted during training. Training of the different layers is discussed in further detail in FIG. 6. The data output of the fully connected layer 440 is then input into a classification layer 445. In some embodiments, the classification layer 445 implements a SoftMax neural network to generate classification scores for the recorded audio data of the environment. In some example embodiments, the scene having the highest classification score is selected as the scene of the environment. The output layer 450 receives information on which scene scores the highest and is thus selected as the scene of the environment. The output layer 450 can use then the identified scene in further processes. For example, if the highest scoring scene is restaurant, the output layer 450 may overlay images (e.g., fork and knife) over video data of the recorded environment.

Figure 5:
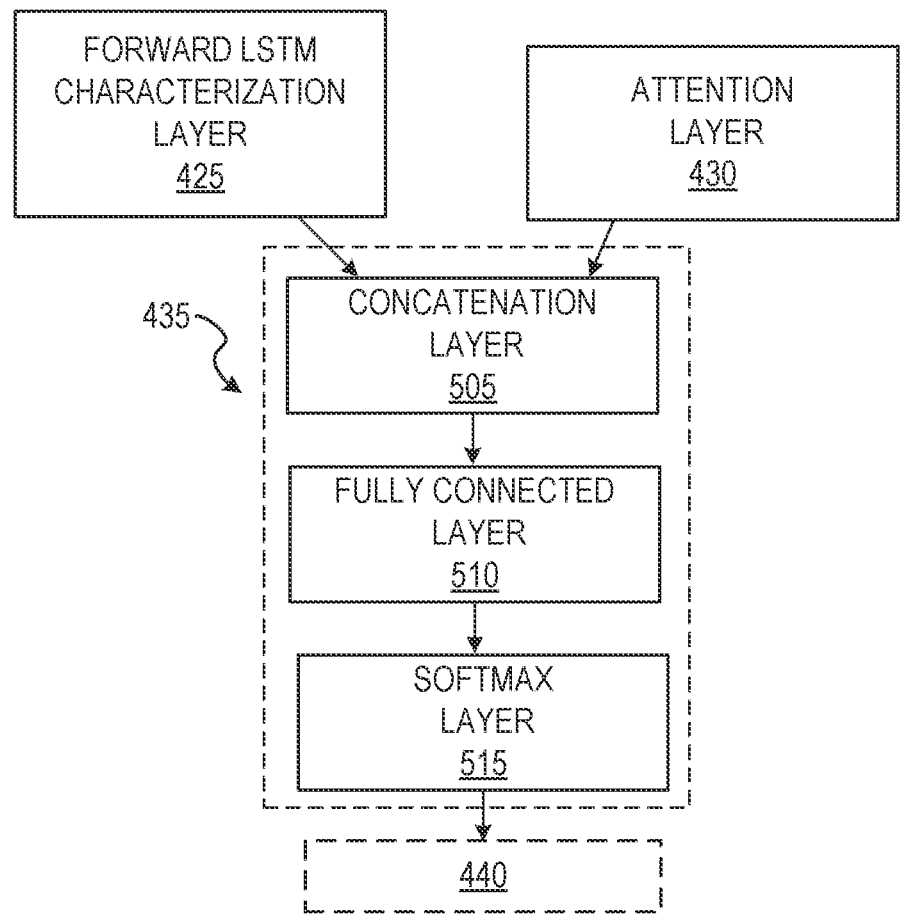
FIG. 5 shows an example architecture of a combination layer having a forward-based neural network, according to some example embodiments.

As mentioned above, FIGS. 5-8 illustrate different example architectures for the combination layer 435, according to some example embodiments. As illustrated in FIG. 5, characterization layer 425 is a forward LSTM that is trained and processes audio data in a forward time direction. In some example embodiments, the forward LSTM characterization layer 425 uses 256 hidden nodes and the output of the final time setup is input into the combination layer 435 for merging with the attention layer 430 output data (e.g., weighted vectors). The combination layer 435 comprises a concatenation layer 505, a fully connected layer 510, and a SoftMax layer 515. According to some example embodiments, the concatenation layer 505 combines by concatenating the forward LSTM data with the attention data. The output of the concatenation layer 505 is output into the fully connected layer 510 for processing, which in turn transmits its data to a SoftMax layer 515 for classification. Optimization (e.g., backpropagation, network training) may occur over the fully connected layer 510 and the SoftMax layer 515 to maximize the likelihood of generating an accurate summary vector (e.g., enhanced characterization data). The output of the combination layer 435 may then be fed into an output layer, such as fully connected layer 440, as discussed above.

Figure 6:
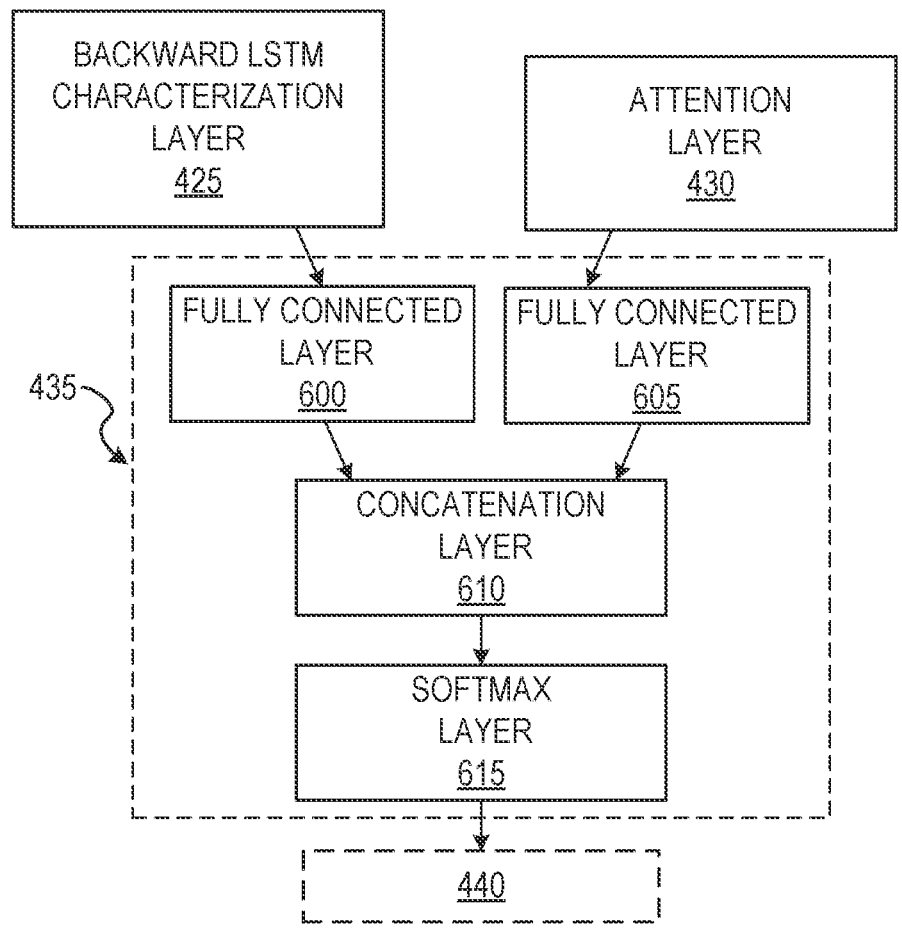
FIG. 6 shows an example architecture of a combination layer having a backward-based neural network, according to some example embodiments.

In some example embodiments, as illustrated in FIG. 6, the characterization layer 425 is a backwards LSTM that processes audio data in a backwards time direction. The backward LSTM characterization layer 425 uses 256 hidden nodes and the output of the final time setup is input into the combination layer 435 for merging with the attention layer 430 output data (e.g., weighted vectors). Further, in some embodiments, the backwards LSTM characterization layer 425 inputs data into a first fully connected layer 600 and the attention layer 430 inputs its data into a second fully connected layer 605. The outputs of the fully connected layers 600 and 605 are then concatenated in concatenation layer 610, which is then input into a SoftMax layer 615 for optimization (e.g., maximizing likelihood of correct result in training). The output of the combination layer 435 may then be fed into an output layer, such as fully connected layer 440.

Figure 7:
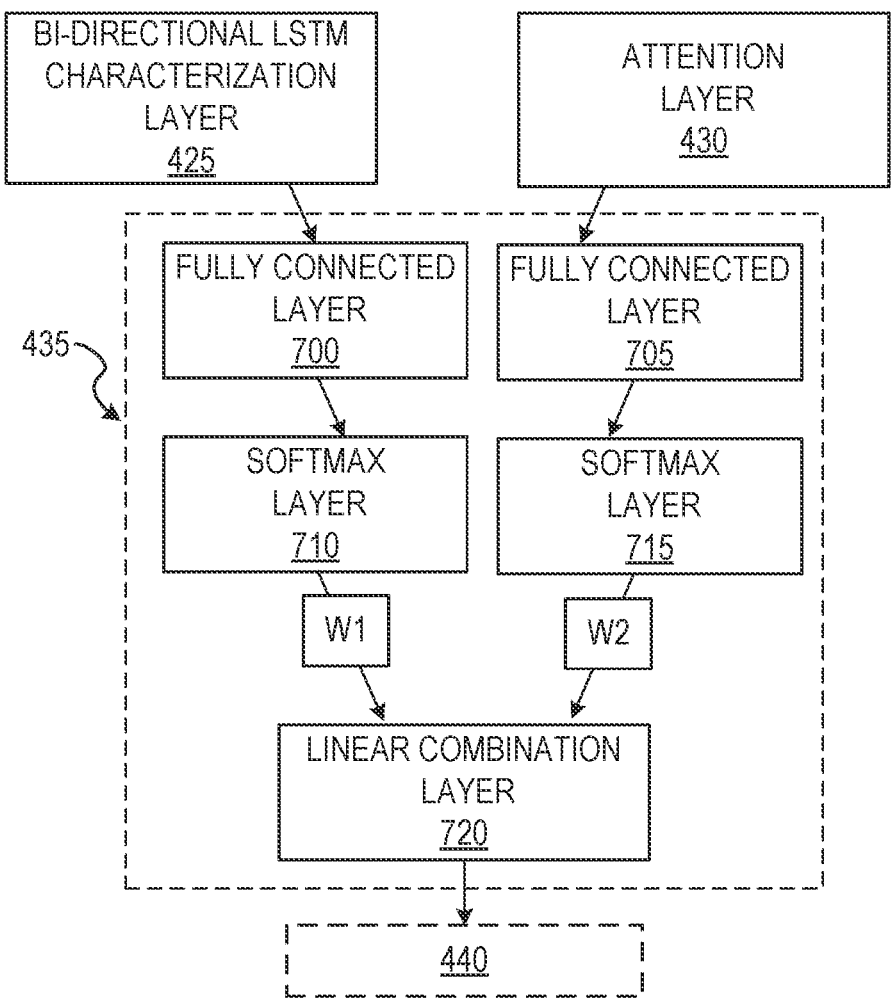
FIG. 7 shows an example architecture of a combination layer having a bidirectional-based neural network, according to some example embodiments.

In some example embodiments, as illustrated in FIG. 7, the characterization layer 425 is implemented as a bidirectional LSTM that generates characterization data by processing audio data in both the forward and backward time directions. The bidirectional LSTM characterization layer 425 can concatenate outputs of the final time steps of the forward direction and backward direction, and pass the concatenated data to the combination layer 435. Further details of the bidirectional LSTM characterization layer 425 are discussed below with reference to FIG. 8. As illustrated in FIG. 7, data outputs from the bidirectional LSTM characterization layer 425 (e.g., the concatenated final and hidden states of both time directions) and the attention layer 430 (e.g., weighted vectors) are input into the combination layer 435. In particular, the characterization layer 425 inputs data into a first fully connected layer 700 and the attention layer 430 inputs its data into a second fully connected layer 705. The first fully connected layer 700 then inputs into a first SoftMax layer 710 and the second fully connected layer 705 inputs into a second SoftMax layer 715. The outputs of the SoftMax layers 710 and 715 are input into a linear combination layer 720. In the linear combination layer 720, each of the SoftMax layer inputs receive a weighting. For example, the output from the first SoftMax layer 710 is weighted by weight scalar "W1" and the output from the second SoftMax layer 715 is weighted by the weight scalar "W2". The linear combination layer 720 then adjusts the weight scalars "W1" and "W2" to maximize the likelihood of an accurate output.

Figure 8:
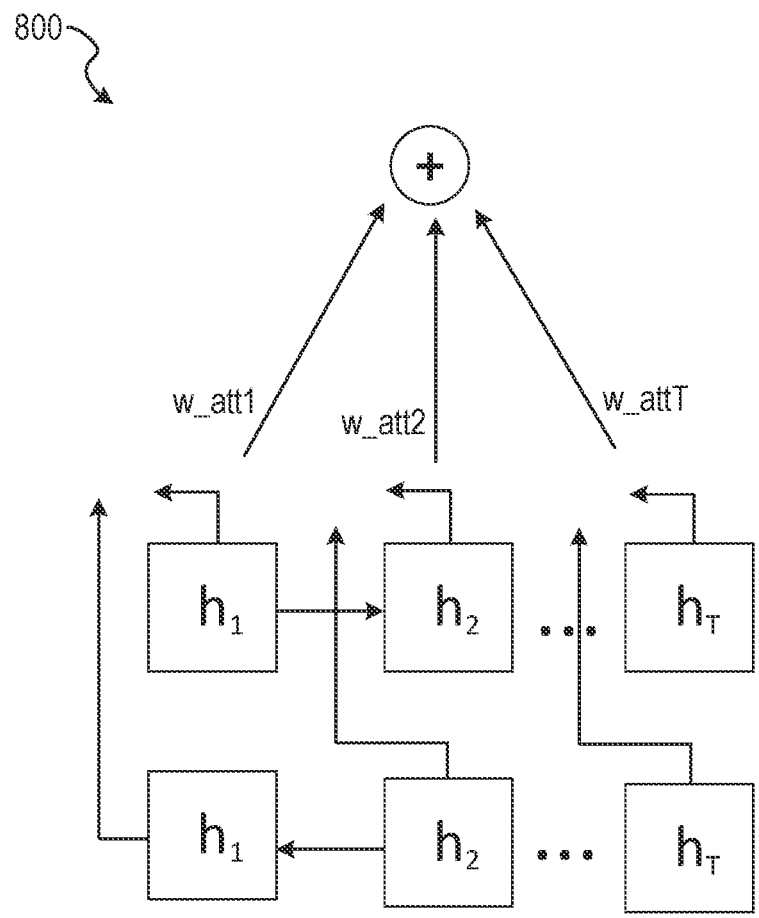
FIG. 8 shows an example configuration of a bidirectional network of the characterization layer, according to some example embodiments.

FIG. 8 shows an example configuration 800 of a bidirectional LTSM of the characterization layer 425, according to some example embodiments. As discussed, the bidirectional LTSM of the characterization layer 425 can concatenate the final steps in both time directions and pass it to the next layer, e.g., a layer that combines attention weights. The final or last output of the final time step in an LSTM summarizes all previous time steps' data for a given direction. As mentioned, some time steps may have information (e.g., audio data of dishes clanging together) that is more indicative of a given type of scene (e.g., a cafe or restaurant). Attention weights can emphasize time steps that correspond more to a certain type of scene. Analytically, and with reference to configuration 800 in FIG. 8, let h(t) denote the hidden state of each LSTM time step with length T. The bidirectional LSTM is configured with a mapping function $f(\cdot)$ that uses hidden states to predict an attention score/weight $w_{att}$ for each time step. The final output $O_{att}$ is the normalized weighted sum of all the hidden states as shown in configuration 800 (each tune step contributes, in each direction). Equations 1-3 describe the time steps of the bidirectional LSTM being combined with attention scores (e.g., "w_att1", "w_att2", "w_att3"), according to some example embodiments. A Softmax function can used to normalize the score, and the output of the Softmax function represents a probabilistic interpretation of the attention scores.

$$w_{att} = f(h(t)) \quad [\text{Ex. 1}]$$

$$w_{att_{norm}} = f(h(t)) \quad [\text{Ex. 2}]$$

$$O_{att} = \Sigma_{t=1}^{T} h(t) * w_{att_{norm}} \quad [\text{Ex. 3}]$$

The mapping function $f(\cdot)$ can be implemented as a shallow neural network with a single fully connected layer and a linear output layer. In some example embodiments, each hidden state predicts its own weight, which is a one-to-one mapping. Further, in some example embodiments, all the hidden states are used together to predict all the weights for each time step, which is an all-to-all mapping. In some embodiments, hidden states of the same time step from both forward and backward directions are concatenated to represent h(t). For example, in the first time step, $h_1$ in the forward direction (which has an arrow leading to $h_2$) is concatenated with $h_1$ in the backward direction.

Figure 9:
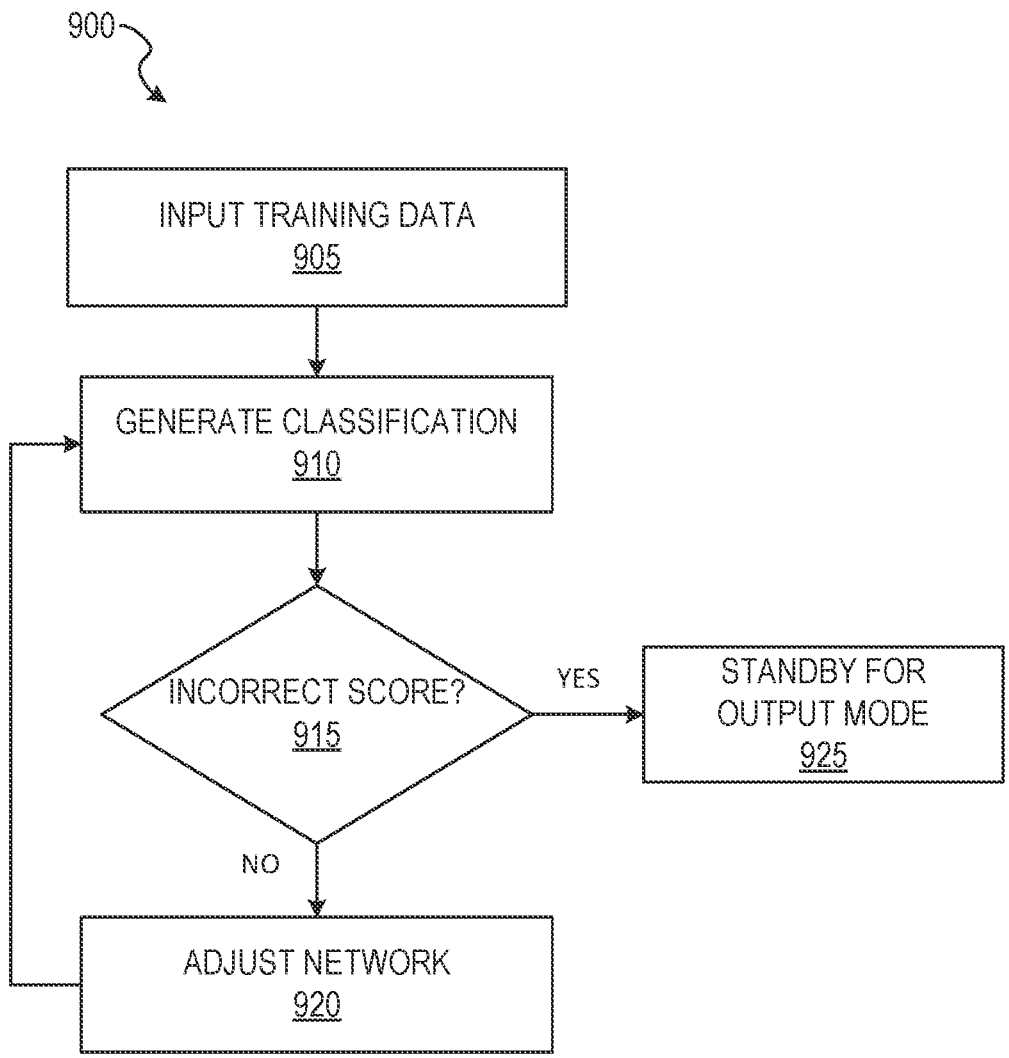
FIG. 9 illustrates a flow diagram for a method for training the deep learning group, according to some example embodiments.

FIG. 9 illustrates a flow diagram for a method 900 for training the deep learning group 210, according to some example embodiments. At operation 905, the training engine 245 inputs the training data into the deep learning group 210 for classification. For example, the training engine 245 instructs the database engine 250 to retrieve the training data from the database 126 via database server 124. In some example embodiments, the training data comprises audio data recorded from fifteen or more scenes, including, for example, audio data recorded from a bus, a cafe, a car, a city center, a forest, a grocery store, a home, a lakeside beach, a library, a railway station, an office, a residential area, a train, a tram, and an urban park.

At operation 910, the deep learning group 210 receives the training audio data for a given scene and generates classification data. In some example embodiments, for a set of training audio data, each scene receives a numerical classification score, as discussed above.

At operation 915, the training engine 245 compares the generated classifications to the known correct scene to determine if the error exceeds a pre-determined threshold. For example, if the training audio data is a recording of a restaurant, then the known correct scene should be "restaurant," which will be indicated as correct by having the highest numerical score. If the generated classification scores do not give the highest numerical score to the correct scene, then the valid response is unlikely (e.g., the maximum likelihood is not achieved) and the process continues to operation 920, where the training engine 245 adjusts the neural networks (e.g., calculates gradient parameters to adjust the weightings of the neural network) to maximize likelihood of a valid response. The process may loop to operation 910 until the correct scene receives the highest classification score. When the correct scene receives the highest score, the method continues to operation 925, where the system is set into output mode. In output mode, the neural networks of the deep learning group 210 are trained and ready to receive audio records and generate classifications.

Figure 10:
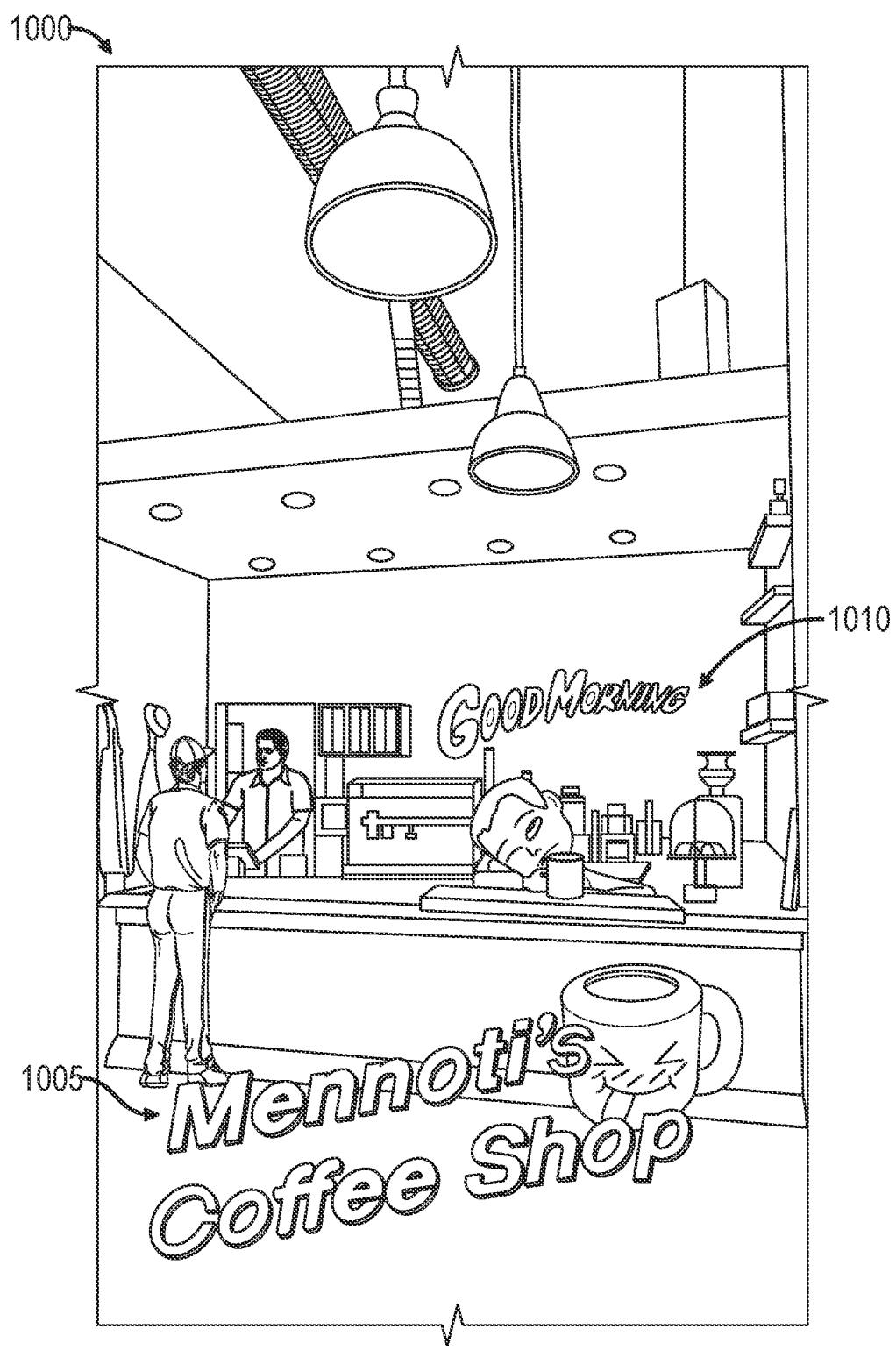
FIG. 10 shows an example user interface of client device implementing acoustic based scene detection, according to some example embodiments.

FIG. 10 shows an example user interface 1000 of client device 110 implementing acoustic based scene detection, according to some example embodiments. In FIG. 10, the user 106 has walked into a coffee shop and used client device 110 to record approximately six seconds of video of the coffee shop. Method 300, discussed above, can then be performed on the client device 110 or on the server 140 to classify the type of scene based on audio data and overlay content. For example, in FIG. 10, the user 106 is in a coffee shop, thus there may be sounds of people talking and dishes clashing. The audio deep ID system 150 can then determine that the user 106 is in a coffee shop and select overlay content, such as user avatar 1010 and location content 1005 for overlay on the video of the coffee shop. One or more frames (e.g., an image or the full six seconds of video) can then be published to a social media network site as an ephemeral message.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a stand-alone computer system, a client computer system, or a server computer system) or one or more hardware modules of a computer system (e.g., a processor or a group of processors) can be configured by software (e.g., an application 114 or application portion) as a hardware module that operates to perform certain operations, as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network 104 (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

Figure 11:
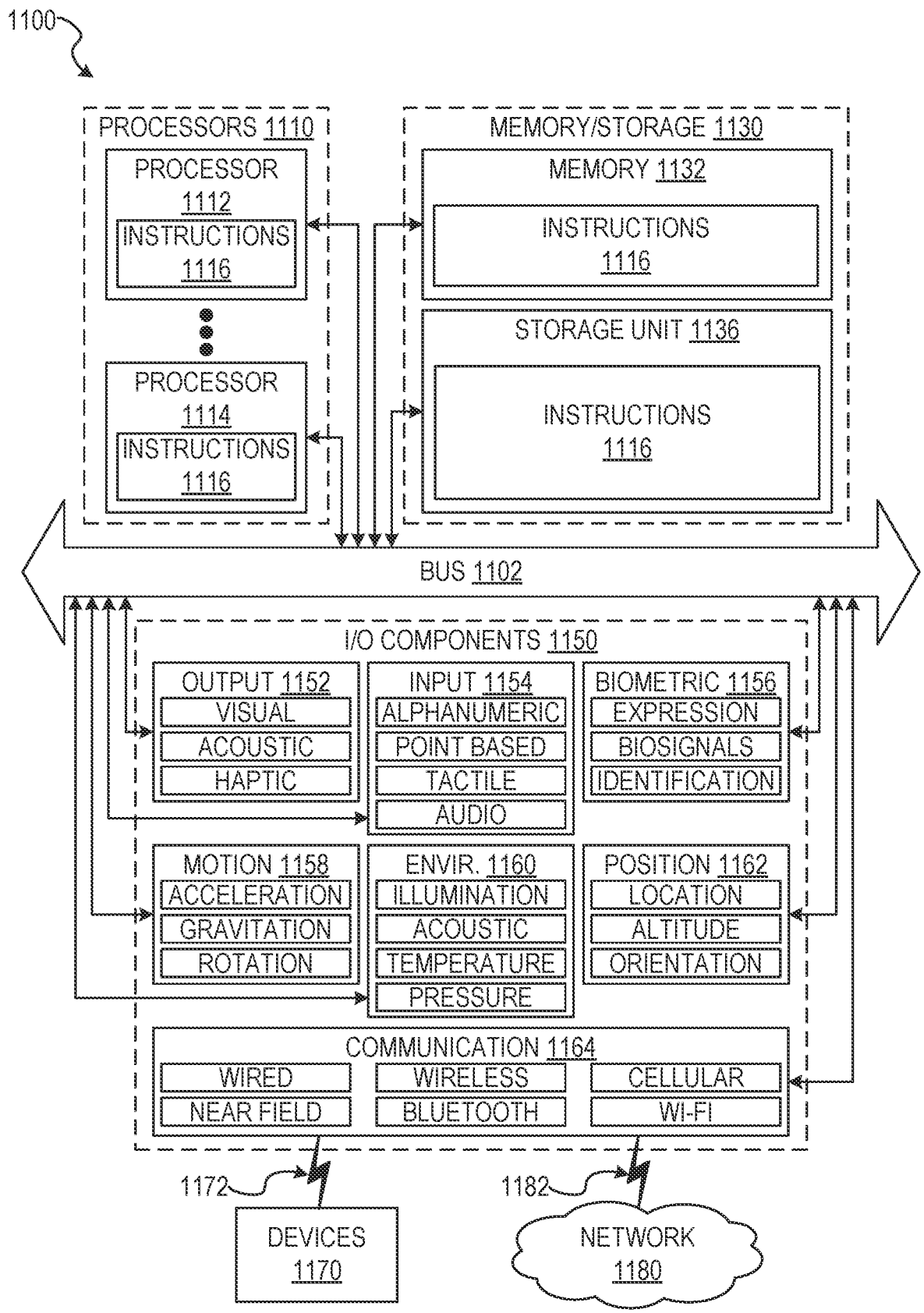
FIG. 11 illustrates a diagrammatic representation of a machine in the form of a computer system within which a set of instructions may be executed for causing the machine to perform any one or more of the methodologies discussed herein, according to an example embodiment.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application 114, an applet, an app, or other executable code) for causing the machine 1100 to perform any one or more of the methodologies discussed herein can be executed. For example, the instructions 1116 can cause the machine 1100 to execute the diagrams of FIGS. 3-6. Additionally, or alternatively, the instruction 1116 can implement the input engine 205, the deep learning group 210, the output engine 240, the training engine 245, the database engine 250, the convolutional engine 215, the recursive engine 220, the attention engine 225, the combination engine 230, and the classification engine 235 of FIG. 2, and so forth. The instructions 1116 transform the general, non-programmed machine into a particular machine programmed to carry out the described and illustrated functions in the manner described. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 can include processors 1110, memory/storage 1130, and input/output (I/O) components 1150, which can be configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) can include, for example, processor 1112 and processor 1114 that may execute instructions 1116. The term "processor" is intended to include multi-core processors that may comprise two or more independent processors (sometimes referred to as "cores") that can execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiples cores, or any combination thereof.

The memory/storage 1130 can include a memory 1132, such as a main memory, or other memory storage, and a storage unit 1136, both accessible to the processors 1110 such as via the bus 1102. The storage unit 1136 and memory 1132 store the instructions 1116 embodying any one or more of the methodologies or functions described herein. The instructions 1116 can also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of the processors 1110 are examples of machine-readable media.

As used herein, the term "machine-readable medium" means a device able to store instructions 1116 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) or any suitable combination thereof. The term "machine-readable medium" should be taken to include a single medium or multiple media (e.g., a centralized or distributed database, or associated caches and servers) able to store instructions 1116. The term "machine-readable medium" shall also be taken to include any medium, or combination of multiple media, that is capable of storing instructions (e.g., instructions 1116) for execution by a machine (e.g., machine 1100), such that the instructions 1116, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1150 can include a wide variety of components to receive input, provide output, produce output, transmit information, exchange information, capture measurements, and so on. The specific I/O components 1150 that are included in a particular machine 1100 will depend on the type of machine 1100. For example, portable machines such as mobile phones will likely include a touch input device or other such input mechanisms, while a headless server machine will likely not include such a touch input device. It will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 can include output components 1152 and input components 1154. The output components 1152 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 1150 can include biometric components 1156, motion components 1158, environmental components 1160, or position components 1162 among a wide array of other components. For example, the biometric components 1156 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 can include acceleration sensor components (e.g., an accelerometer), gravitation sensor components, rotation sensor components (e.g., a gyroscope), and so forth. The environmental components 1160 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 can include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 11100 via a coupling 1182 and a coupling 11102, respectively. For example, the communication components 1164 include a network interface component or other suitable device to interface with the network 1180. In further examples, communication components 1164 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 11100 may be another machine or any of a wide variety of peripheral devices (e.g., a peripheral device coupled via a Universal Serial Bus (USB)).

Moreover, the communication components 1164 can detect identifiers or include components operable to detect identifiers. For example, the communication components 1164 can include radio frequency identification (REIT) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF4111, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can lie derived via the communication components 1164, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1180 can be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or other type of cellular or wireless coupling. In this example, the coupling 1182 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1116 can be transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, the instructions 1116 can be transmitted or received using a transmission medium via the coupling 1172 (e.g., a peer-to-peer coupling) to devices 1170. The term "transmission medium" shall be taken to include any intangible medium that is capable of storing, encoding, or carrying the instructions 1116 for execution by the machine 1100, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
identifying sound recording data on a user device;
generating, by the user device, an acoustic classification of the sound recording data using an acoustic classification neural network, the acoustic classification neural network comprising a convolutional neural network layer that generates audio feature data that are weighted by an attention layer that updates a recursive neural network layer;
storing the acoustic classification on the user device;
selecting a content item based on the acoustic classification;
overlaying the content on an image of a live video feed generated by the user device; and
publishing the image with the overlaid content as an ephemeral message of a social media network site.

2. The method of claim 1, wherein the attention layer is a fully connected neural network layer.

3. The method of claim 1, wherein the recursive neural network layer processes the audio feature data from the convolutional neural network layer over time steps of recursive neural network layer.

4. The method of claim 3, wherein the audio feature data generated by the convolutional neural network layer is weighted by the attention layer for each of the time steps, and wherein the data processed by the recursive neural network layer is the weighted audio feature data.

5. The method of claim 1, further comprising:
generating an audio recording of a physical environment using a sound sensor of the user device.

6. The method of claim 5, further comprising:
converting the audio recording into the sound recording data of the physical environment.

7. The method of claim 6, wherein the audio recording is in a non-visual image format and the sound recording data is a visual image format.

8. The method of claim 1, wherein the attention layer is trained to generate the acoustic classification using back-propagation.

9. The method of claim 8, wherein the acoustic classification neural network is trained on training audio from one or more different environments including at least an outdoor environment and an indoor environment.

10. The method of claim 1, wherein the acoustic classification neural network further comprises a classification layer that generates the acoustic classification.

11. The method of claim 10, wherein the classification layer outputs a numerical value for each scene category of a plurality of scene categories, the numerical value indicating a likelihood that the acoustic classification is of a given scene category from the plurality of scene categories.

12. The method of claim 11, wherein the plurality of scene categories include one or more of a group comprising: a bus, a cafe, a car, a city center, a forest, a grocery store, a home, a lakeside beach, a library, a railway station, an office, a residential area, a train, a tram, and an urban park.

13. The method of claim 1, wherein the sound recording data is a spectrogram comprising frequency on a vertical axis and time on a horizontal axis.

14. A system comprising:
one or more processors of a machine; and
a memory comprising instructions that, when executed by the one or more processors, cause the machine to perform operations comprising:
identifying sound recording data;
generating an acoustic classification of the sound recording data using an acoustic classification neural network, the acoustic classification neural network comprising a convolutional neural network layer that generates audio feature data that are weighted by an attention layer that updates a recursive neural network layer;
storing the acoustic classification on the user device;
selecting a content item based on the acoustic classification;
overlaying the content on an image of a live video feed generated by the machine; and
publishing the image with the overlaid content as an ephemeral message of a social media network site.

15. The system of claim 14, wherein the attention layer is a fully connected neural network layer.

16. The system of claim 14, wherein the recursive neural network layer processes the audio feature data from the convolutional neural network layer over time steps of recursive neural network layer.

17. The system of claim 16, wherein the audio feature data generated by the convolutional neural network layer is weighted by the attention layer for each of the time steps, and wherein the data processed by the recursive neural network layer is the weighted feature data.

18. The system of claim 14, the operations further comprising:
generating an audio recording of a physical environment using a sound sensor.

19. A non-transitory computer readable storage medium comprising instructions that, when executed by one or more processors of a device, cause the device to perform operations comprising:
identifying sound recording data;
generating an acoustic classification of the sound recording data using an acoustic classification neural network, the acoustic classification neural network comprising a convolutional neural network layer that generates audio feature data that are weighted by an attention layer that updates a recursive neural network layer;
storing the acoustic classification on the user device;
selecting a content item based on the acoustic classification;

overlaying the content on an image of a live video feed generated by the machine; and publishing the image with the overlaid content as an ephemeral message of a social media network site.

20. The non-transitory computer readable storage medium of claim 19, wherein the attention layer is a fully connected neural network layer.

* * * * *